United States Patent
Trampusch

[19]

[11] Patent Number: 5,932,026
[45] Date of Patent: Aug. 3, 1999

[54] METHOD OF CLEANING AN INNER WALL OF A MOLD BY MEANS OF DRY ICE

[75] Inventor: Berthold Trampusch, Solingen, Germany

[73] Assignee: L'Air Liquide, Paris Cedex, France

[21] Appl. No.: 09/047,483

[22] Filed: Mar. 25, 1998

[30] Foreign Application Priority Data

Mar. 25, 1997 [DE] Germany .................. 197 12 513

[51] Int. Cl.$^6$ .................................................. B08B 3/02
[52] U.S. Cl. .................. 134/7; 134/6; 134/8; 134/22.18; 134/24; 134/42; 134/167 R; 134/168 R; 239/264; 239/265; 451/38; 451/39; 451/75; 451/102
[58] Field of Search .................... 134/6, 7, 8, 22.18, 134/24, 42, 167 R, 168 R; 239/264, 265; 451/38, 39, 75, 102

[56] References Cited

U.S. PATENT DOCUMENTS

| | | | |
|---|---|---|---|
| 4,603,515 | 8/1986 | Gilmore et al. .................. 51/424 |
| 4,918,876 | 4/1990 | Donath et al. .................. 51/426 |
| 5,529,636 | 6/1996 | Nohara et al. .................. 134/1.1 |
| 5,795,214 | 8/1998 | Leon .................. 451/102 |

FOREIGN PATENT DOCUMENTS 43 14 264 C1  10/1994  Germany .

Primary Examiner—Jill Warden
Assistant Examiner—S. Carrillo
Attorney, Agent, or Firm—Burns, Doane, Swecker, & Mathis, L.L.P.

[57] ABSTRACT

A method for cleaning an inner wall of a mold part includes forming a chamber between displaced mold parts by introducing a casing between the mold parts. The casing enclosures a blasting device for introducing a blasting nozzle which directs a cleaning jet at the inner wall. The chamber encapsulates noise and particles which are produced during the cleaning process.

9 Claims, 4 Drawing Sheets

METHOD OF CLEANING AN INNER WALL OF A MOLD BY MEANS OF DRY ICE

BACKGROUND OF THE INVENTION

1. Field of the Invention

The subject matter of the invention includes a method and an apparatus for cleaning an inner wall of a mold. In particular, the present invention includes a method and apparatus for cleaning an inner wall of a mold for producing vehicle tires, by means of dry-ice pellets.

2. Related Art

An extremely wide range of cleaning methods are known for the purpose of cleaning metallic components. The cleaning methods may be subdivided into physical and/or chemical cleaning methods. The chemical cleaning methods are based on the particles of dirt which adhere to the component being subjected to a chemical reaction by the action of a cleaning agent and being detached from the component as a result. Special apparatuses, which are complex and very expensive, are necessary for carrying out chemical cleaning. As a result of the generally aggressive cleaning media, only high-quality, chemically resistant materials can be used in such cleaning apparatuses. Cleaning apparatuses which operate on a chemical basis are also subject to stringent legal regulations which can only be met by considerable outlay on equipment.

As an alternative to chemical cleaning, components may be cleaned by physical methods. In this case, the contaminants are removed mechanically from the component by abrasion. Abrasive media may be used for removing contaminants from a component. Abrasive media may be in the form of sand, cork or glass. Probably best-known method of mechanically removing contaminants from a component is the so-called sand-blasting method. Sand blasting is preferably carried out in separate chambers, in which the component is introduced and blasted by a sand-blasting device.

DE 43 14 264 C1 discloses a sand-blasting device which is suitable for cleaning rims of motor-vehicle wheels. The motor-vehicle rim which is to be cleaned is arranged in a housing, the base of which is of funnel-like design. The funnel-like base of the housing is connected to a sand-collecting area by a connecting duct. The sand-collecting area is connected to the sand-blasting device via a sand-feed line. The sand-blasting device may be located in the housing. According to DE 43 14 264 C1, it is possible for only the front, nozzle-like end of the sand-blasting device to project into the housing. This configuration of the apparatus for cleaning rim of motor-vehicle wheels minimizes the sand consumption since the cleaning sand runs around in a closed circuit.

In addition, U.S. Pat. No. 4,603,515 discloses a means for removing a layer of corrosion from the walls of the booster of a bomb. The layer of corrosion is removed by sand blasting. In order to remove the sand from the shell of the bomb, a vacuum means is provided.

Sand-blasted components subsequently have to be subjected to careful cleaning in order to ensure that the fine sand is removed from all possible niches of the component. The use of sand blasting for cleaning molds, in particular molds for producing plastic parts, is very costly because of the relatively high cost outlay for cleaning, which is necessary in order to remove the sand from all possible niches of the mold. The possible ways of cleaning components which have been described above require that the component which is to be cleaned is provided separately. In the case of molds of plastic-processing machines or molds for producing vehicle tires, then it is necessary for the mold to be removed from the machine. Once the cleaning operation has been carried out, the machine has to be set up anew. This procedure for cleaning molds is costly and results in the operating time of the machine being reduced considerably.

In order to avoid the removal and reinstallation of a mold, it is also known for such molds to be cleaned manually. This method of cleaning is hazardous to the personnel carrying out the cleaning since aerosols are produced during the cleaning operation, which may have an adverse effect on health if suitable protective measures are not provided for the personnel. In addition, cleaning of the inner wall of the mold can be difficult due to a multiplicity of narrow and short depressions.

It is also known for components to be cleaned by means of dry-ice pellets. Dry ice is carbon dioxide which has been converted into the solid physical state. Under atmospheric pressure, dry ice changes directly from the solid physical state into the gaseous state without any melt liquid being produced. Cleaning with dry ice thus has the advantage that no residues of the dry ice remain in the mold. With the aid of a carrier medium, e.g. air or nitrogen, the dry-ice pellets are blasted, via a cleaning nozzle, against the component which is to be cleaned. The pellets remove the contaminants from the wall of a component. The mechanical removal of the contaminants is assisted by the refrigerating action of the dry ice, which is at a temperature of at least $-78.5°$ C. During cleaning there is a high emission of sound. The source of the sound emission is the cleaning nozzle, through which the cleaning jet which contains dry-ice pellets emerges. A reduction in the sound emission at the cleaning nozzle has been achieved by a further development of the cleaning nozzle. However, the sound emission is still of such a magnitude that cleaning of a component can only be carried out if costly sound-insulation measures are taken.

OBJECTS AND SUMMARY

An object of the present invention is to specify a method and an apparatus for cleaning an inner wall of a mold which allow the molds to be cleaned with at a low cost. In particular, the intention is to specify a possible way of cleaning which does not require the mold to be removed from its associated machinery. Therefore, the production process is not disrupted by the cleaning operation. The invention is particularly applicable to molds of vehicle tires.

The invention includes an inventive method of cleaning an inner wall of at least one part of a two part mold, each part can be displaced relative to one another along an axis and, in a closed state, form a complete mold. The mold is preferably a mold of a plastic-processing machine. The inventive method is particularly useful for cleaning the inner wall of a mold used for producing tires. According to a method of the invention, when the mold parts are spaced apart from one another in an open state, a casing and a movable blasting device are introduced between the mold parts. A chamber which is bounded by the casing and the mold parts are then formed. Once the chamber has been formed, a cleaning jet which contains dry-ice pellets and a carrier medium is introduced. The cleaning jet emerges from a blasting nozzle of the blasting device. At least the blasting nozzle of the blasting device is moved, so that the cleaning jet is directed against parts of the surface of the inner wall. The formation of the chamber considerably reduces sound emission during the cleaning operation since the casing and the mold parts together effect encapsulation of the sound which is produced during cleaning. Any adverse effects on the surroundings are consequently reduced to such an extent that cleaning of the mold can take place directly at the machine without any adjacent processes being disrupted. The way of implementing the method according to the invention makes it possible for the inner wall to be cleaned without there being any need for the mold to be removed from the machine. Cleaning can thus take place on site. This achieves cost-effective cleaning of the mold since, in contrast with the method known up until now, there is no need for any labor-intensive work to be carried out. Furthermore, there is a reduction in the downtime of the machine, which means the machine is better utilized.

The distance between the mold parts when the mold is in the open state cannot be varied at will. This distance is predetermined by the design of the machine. In order for it to be possible to introduce the casing comfortably between the mold parts, the casing is preferably collapsed or folded such that its height is smaller than the distance between the open mold parts. In order to form the chamber, it is thus proposed that the casing be telescoped, with the result that it butts against the relevant mold part by way of its respective end regions.

According to a further aspect of the invention, it is proposed that sealing of the chamber be achieved by the casing which butts against the relevant mold part by way of its respective end regions. A machine-control means allows displacement of at least one mold part along an axis, and that the casing has a certain degree of stiffness.

According to a further advantageous embodiment of the invention, it is proposed that a cage-like framework, on which the casing is secured, be introduced between the mold parts. The framework has an annular bottom part and an annular top part as well as spacers. The spacers are connected to the bottom part and the top part. The spacers are telescoping and permit the top and bottom parts to engage the relevant mold part. Alternatively, it is possible to displace at least one of the mold parts along the axis, with the result that the bottom part and the top part of the framework and/or the casing, by way of its respective end regions, butt/butts against the relevant part-mold.

Telescoping of the spacers has the advantage that, in the case of machines whose machine-control means allow for just two mold states, namely an open state and a closed state, the bottom part and the top part can be made to butt against the respective mold part without there being any need for activation of the machine-control means. This embodiment of the invention is also advantageous in the case of machines in which the displacement path of at least one mold part is to be controlled manually. Since it is not necessary to move the mold parts to engage the casing/framework, any carelessness of the operating personnel which may damage the casing/framework is avoided.

It is proposed, according to a further advantageous embodiment, that the respective end regions of the casing and/or the bottom part and the top part be connected to the relevant mold part in an air-tight manner.

In order to reduce any adverse effects caused by aerosols, it is proposed, that the particles detached from the inner wall of the mold be filtered out through a partially gas-permeable casing. It is preferable that the particles be filtered out through a particle filter integrated in the casing.

An inner wall of a mold is preferably cleaned by directing the cleaning jet against the entire inner wall in a stepwise manner. In this way the consumption of the dry-ice pellets and of the carrier medium is low. It is preferable here for the cleaning jet to be displaced continuously.

The degree to which a mold is contaminated may differ in different regions of the mold. It is thus proposed that the cleaning jet be directed against individual sections of the inner wall one after the other. In this case, the cleaning jet can pass over a section of the inner wall a number of times. The movement of the cleaning jet is preferably positively controlled.

The inventive apparatus for cleaning an inner wall of at least one mold part of a two part-mold is distinguished by a casing, a movable blasting device and a supply unit. The movable blasting device has at least one blasting nozzle from which there emerges a cleaning jet which is directed against at least part of the surface of the inner wall and contains dry-ice pellets and a carrier medium. The blasting device is connected to the supply unit via at least one supply line, the supply unit providing the dry-ice pellets and a carrier medium. The carrier medium is preferably compressed air. The casing and the blasting device of the apparatus according to the invention can be introduced between the mold parts. The casing and the mold parts define a chamber during the cleaning operation. This chamber, which is partially bounded by the integral components of the mold which is to be cleaned, forms a means for encapsulating sound. The encapsulation of the sound achieves a considerable reduction in sound emission during cleaning. As a result, it is possible for the mold to be cleaned without the latter having to be removed from its associated machinery. A further advantage of the apparatus is that cleaning of the mold can also be carried out without interruption in production and operation of the machinery. This design of the apparatus also reduces the cleaning costs since there, is a reduction in the downtime of the machine.

According to an advantageous aspect of the apparatus, it is proposed that the casing be of flexible design. The flexible configuration of the casing means that it is easier for the latter to be introduced between the mold parts, as a result of which the apparatus is easier to handle.

Encapsulation achieves a reduction in the sound emission. In order to reduce this further, it is proposed that the casing be of sound-insulating design. For this purpose, the casing preferably has a sound-insulating structure. As a supplement or alternative to a sound-insulating casing structure, said casing preferably has a sound-insulating coating.

The casing and/or the bottom part and the top part of the framework preferably has/have an elastic seal. These seals can be made to butt against the relevant mold part. The elastic seal ensures that no gap is produced between the casing and/or the top part and the bottom part of the framework and the respective mold part through which sound can emerge from the chamber. A further advantage of the elastic seal can be seen in the fact that the seal correspondingly fits closely against the mold parts. Therefore, the casing and/or of the bottom part and of the top part of the framework do not have to precisely conform to the surface (s) of the mold parts.

The cleaning jet contains dry-ice pellets and a carrier medium. The carrier medium is preferably compressed air. In the case of an essentially air-tight configuration of the chamber, there would be a build-up of pressure within this chamber and, in some circumstances, this build-up of pressure would result in the casing being destroyed. In order to avoid this, it is possible for the casing to be at least partially gas-permeable. The mold may also have material-feed openings and air-extraction bores connected to the surroundings. In the event of a build-up of pressure in the chamber, flow from the chamber through the material-feed openings and air-extraction bores to the surroundings would occur. This gas flow would also entrain particles which, in some circumstances, would result in blockage of the openings. In order to avoid this, an at least partially gas-permeable design of the casing is preferred. The casing, which is at least partially gas-permeable, is configured such that it is impermeable to particles. This ensures that the particles of dirt detached during the cleaning operation are not blown into the surroundings.

The casing preferably has a particle filter which is exchangeable. The particle filter retains in the filter the particles of dirt detached during cleaning, as a result of which any adverse effects on the surrounding atmosphere caused by the cleaning operation are avoided. The capacity of the particle filter to be exchanged enhances the availability of the apparatus since cleaning of the casing is not absolutely necessary.

The casing is preferably of essentially zigzag-shaped design in cross-section. It can thus be collapsed and telescoped in the manner of an accordion. Preferably, the casing is of essentially tubular or bellows-like design.

The molds whose interior are to be cleaned by the apparatus according to the invention may be of an extremely wide range of configurations and structures. The cleaning nozzle preferably directs the cleaning jet against the inner wall of the mold such that the entire inner wall is cleaned in a stepwise manner. In order to achieve this, the apparatus has a handling means on which the cleaning nozzle is or nozzles is (are) arranged. The handling means permits a local change in a cleaning jet emerging from a cleaning nozzle, with the result that the entire inner wall is cleaned by the cleaning jet, which contains dry-ice pellets. With knowledge of the configuration of the inner wall, the movement of the cleaning nozzle can be controlled by means of a corresponding control unit. The control unit causes the cleaning nozzle to sweep over individual sections of the inner wall continuously or one after the other. In the case of more straightforward molds, it is expedient, in some circumstances, to change the position of the cleaning nozzle, and thus of the cleaning jet, manually. Manual operation is suitable, in particular, when the frequency of mold cleaning is relatively low. Automated cleaning of the mold, however, is preferable since the cleaning times and cleaning action can be optimized by the positively controlled movement of the cleaning nozzle. Optimization of the cleaning action and of the cleaning times results, inter alia, in a reduction in the consumption of dry-ice pellets. Therefore, the costs of the cleaning operation can be minimized. In addition to the lower costs for cleaning, there is a reduction in the cost of equipment for providing large quantities of dry ice.

According to a further advantageous aspect of the apparatus, it is proposed that the handling means has a central unit and at least one arm which is connected to the central unit, and on which the blasting unit is arranged. The central unit is arranged outside the chamber, the arm extending through the casing.

The central unit and the supply unit are arranged on a transportable load-bearing structure. From the aspect of safety, it is proposed that the load-bearing structure has a protective housing in which the central unit and the supply unit are arranged.

For the purpose of positioning the load-bearing structure on a machine whose mold is to be cleaned, it is proposed that the load-bearing structure have a positioning means.

According to a further advantageous aspect, it is proposed that the casing be arranged on a cage-like framework, the framework having an annular bottom part and an annular top part as well as spacers which are connected to the bottom part and the top part. The cage-like framework and the casing are designed such that the bottom part and the top part and/or the casing, by means of its respective end regions, can be made to butt against the relevant mold part. For this purpose, it is proposed that the spacers be of a telescopic configuration. The capacity of the spacers to telescope can be achieved in that said spacers are formed by cylindrical members.

The casing preferably encloses the framework. The casing may be connected to the framework in a releasable manner.

According to a further preferred configuration of the apparatus, it is proposed that the handling means be arranged within the space bounded by the framework. As a result, the framework, along with the casing and the handling means, is introduced between the mold parts. The handling means is preferably a six-axis robot. In the case of a further configuration of the apparatus, the handling unit is arranged on a carrying ring which can be rotated about a longitudinal axis of the framework. During cleaning, rotation of the carrying ring can position the handling means within the chamber. The carrying ring is preferably arranged on the bottom part in a rotatable manner. For precise positioning of the carrying ring within the chamber, it is proposed that the bottom part have a toothing arrangement with which a gear wheel arranged on a drive shaft of a drive can be brought into operative connection, the drive being arranged on the carrying ring in a stationary manner. The drive is preferably a stepping motor. If appropriate, a gear mechanism may be arranged between the drive shaft and the drive.

BRIEF DESCRIPTION OF THE DRAWING FIGURES

Further advantages and details of the method of, and of the apparatus for, cleaning an inner wall of a mold are explained with reference to drawing figures in which:

FIG. 1 shows a schematic view of a first exemplary embodiment of a cleaning apparatus, FIG. 2 shows a schematic view of a framework on a part-mold, FIG. 3 shows a schematic view of a carrying ring with a handling means, FIG. 4 shows a perspective view of an apparatus with a top part-mold, FIG. 5 shows an apparatus as in FIG. 4 but with a bottom part-mold, and FIG. 6 shows a schematic view of another exemplary embodiment of a cleaning apparatus.

DETAILED DESCRIPTION OF THE PREFERRED EMBODIMENTS

Figure 1:
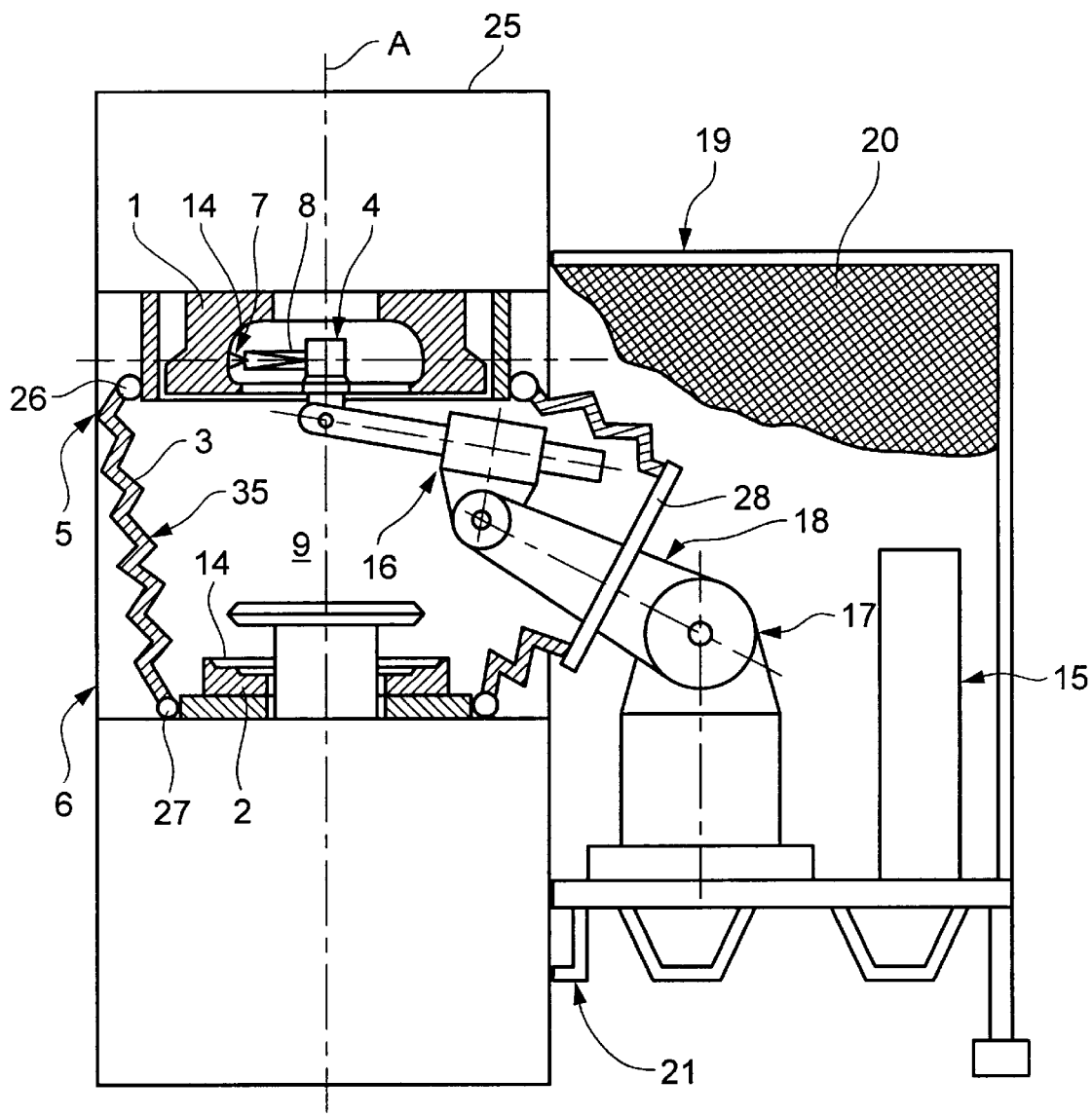

FIG. 1 shows a schematic view of a first exemplary embodiment of an apparatus for cleaning an inner wall of a mold. The mold which is illustrated in FIG. 1 is a mold for producing tires. The mold has a top mold part 1 and a bottom mold part 2. The top mold part 1 is designed to be displaceable along the axis A. The top mold part 1 and the bottom mold part 2 are arranged in a machine 25. In the state which is illustrated in FIG. 1, the mold is open. For the purpose of cleaning an inner wall 14 of the top mold part 1 and/or of the bottom mold part 2, an apparatus which has a casing 3 is provided. The casing 3, as can be seen from FIG. 1, is of zigzag-shaped, essentially tubular design. The casing 3 is flexible. It has sound-insulating properties. Furthermore, the casing 3 is at least partially gas-permeable. In particular, it is designed wholly or partially as a particle filter 35, or is provided with a particle filter 35.

The casing 3 is arranged between the mold parts 1 and 2. The casing 3 and the mold parts 1, 2 define a chamber 9. The end region 5 of the casing 3 butts against the outer wall of the mold part 1. The other end region 6 of the casing 3 butts against the mold part 2. A fastening device 26 is provided for air-tight attachment of the end region 5 of the casing 3. A corresponding fastening device 27 is provided at the end region 6.

A blasting device 4 which has at least one blasting nozzle 8 is arranged in the chamber 9. Emerging through the blasting nozzle 8, against at least part of the surface of the inner wall 14, is a cleaning jet 7 which contains dry-ice pellets and a carrier medium. The blasting device 4 is connected to a supply unit 15 via supply lines (not illustrated). The supply unit 15 preferably comprises a supply container with dry-ice pellets and a compressed-gas source, which may be, for example, a gas cylinder.

The blasting device 4 is arranged on a handling device 16. The handling device 16 is preferably a multi-axis robot. The handling device 16 has a central unit 17 which is connected to an actuating arm 18. The central unit 17 is arranged outside the chamber 9. The arm 18 ,extends into the chamber 9. Connected to the arm 18 is a connecting plate 28, which is also connected to the casing 3.

The supply unit 15 and the central unit 17 are arranged on a transportable load-bearing structure 19. The load-bearing structure 19 has a housing 20 in which the central unit 17 and the supply unit 15 are arranged. The load-bearing structure 19 also has a positioning device 21, which can be brought into contact with the framework of the machine 25, as a result of which the structure 19 assumes a predetermined position with respect to the machine 25.

An apparatus for cleaning an inner wall 14 of at least one mold part 1, 2, which is illustrated in FIG. 1 operates as follows:

Once the mold part 1 has been displaced along the axis A, the casing 3 and the blasting device 4 are introduced between the mold parts 1, 2. The end regions 5, 6 of the casing 3 are made to butt against the mold parts 1, 2, respectively. There is preferably an air-tight connection between the end region 5 and the mold part 1 and between the end region 6 and the mold part 2. The casing 3 and the mold parts 1, 2 define a chamber 9. The inner wall 14 of the mold part 1, 2 is blasted by the blasting nozzle 8 of the blasting device 4. For this purpose, the blasting device 4 is moved appropriately. The blasting device 4 is moved by the handling device 16.

FIGS. 2 to 5 show parts of a further embodiments of an apparatus for cleaning an inner wall 14 in at least one mold part 1, 2 of a mold.

Figure 2:
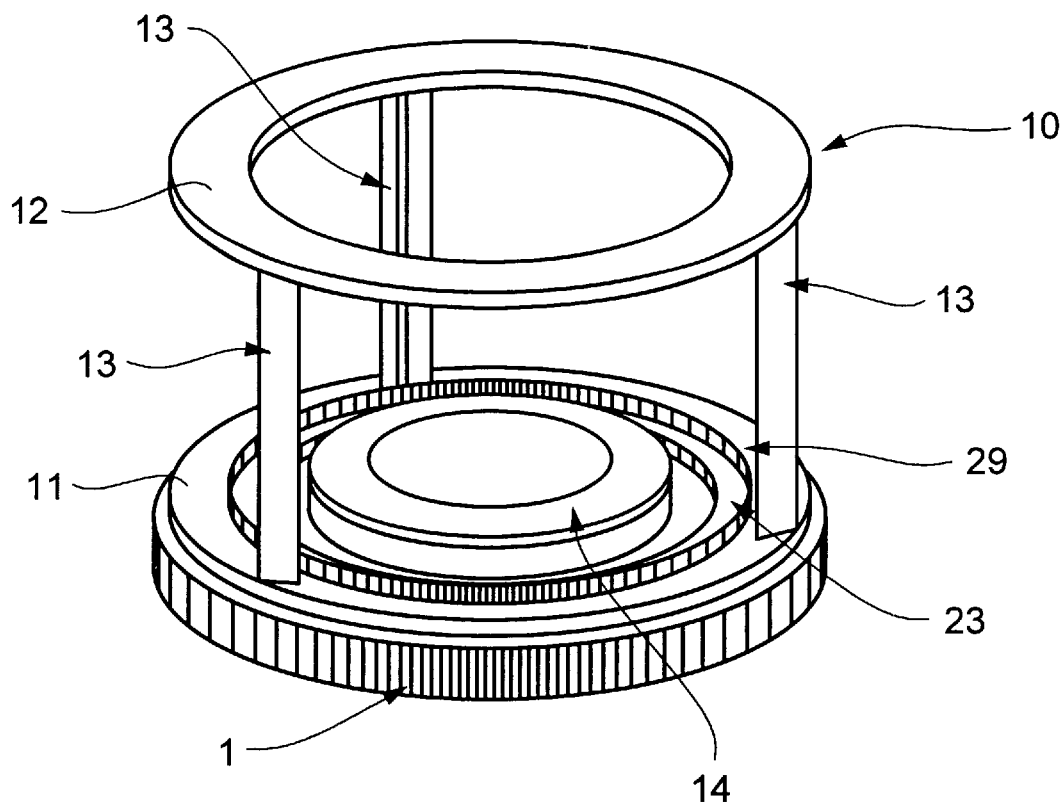

FIG. 2 illustrates a mold part 1 on which a cage-like framework 10 is arranged. The cage-like framework 10 has an annular bottom part 11 and an annular top part 12. The bottom part 11 and the top part 12 are connected to one another by spacers 13. In the exemplary embodiment illustrated, the spacers 13 are arranged in an equidistant manner with respect to one another as seen in the circumferential direction. The spacers 13 are preferably profile bars. A casing 3 (not illustrated) may be arranged on the cage-like framework. A guide rail 29 is arranged on that surface of the bottom part 11 which faces the top part 12. The function of the guide rail 29 will be discussed in more detail below. The bottom part 11 also has a toothed rim with an internal toothing arrangement 23.

Figure 3:
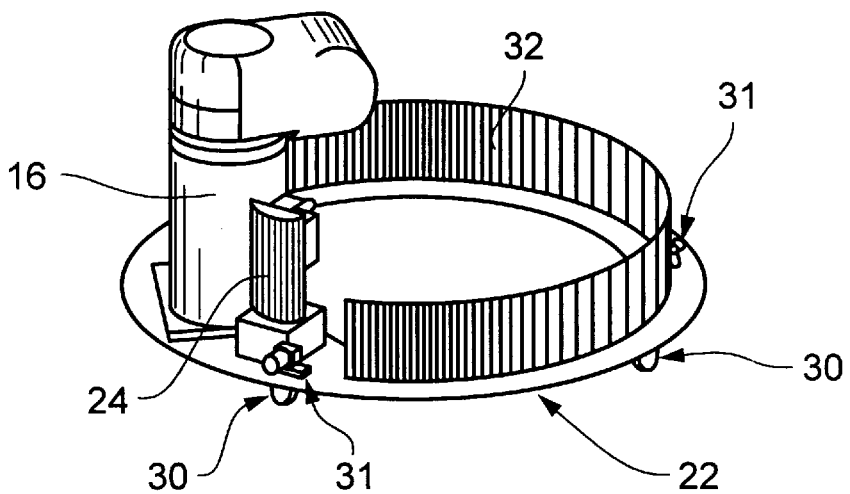

A carrying ring 22, as is illustrated in FIG. 3, may be arranged within the framework 10. On its bottom surface, the carrying ring 22 has guide rollers 30, which are guided along the guide rail 29 of the bottom part 11. A handling device 16 is arranged on the top side of the carrying ring 22. Furthermore, the carrying ring 22 has a drive 24, which has a drive shaft with a gear wheel (not illustrated) which engages in the toothing arrangement 23 of the bottom part 11. By virtue of the drive 24 being actuated, the carrying ring 22 can be rotated relative to the framework 10. The drive 24 is preferably a stepping motor. FIG. 3 also shows that rollers 31 are provided on the top side of the carrying ring 22, said rollers being distributed over the circumference of an imaginary circle. The rollers 31 serve for receiving a so-called energy-management chain (not illustrated) by way of which the consumables are fed from the supply unit to the handling unit 16 and the blasting device 4. A guide 32 is provided for guiding the energy-management chain.

Figure 4:
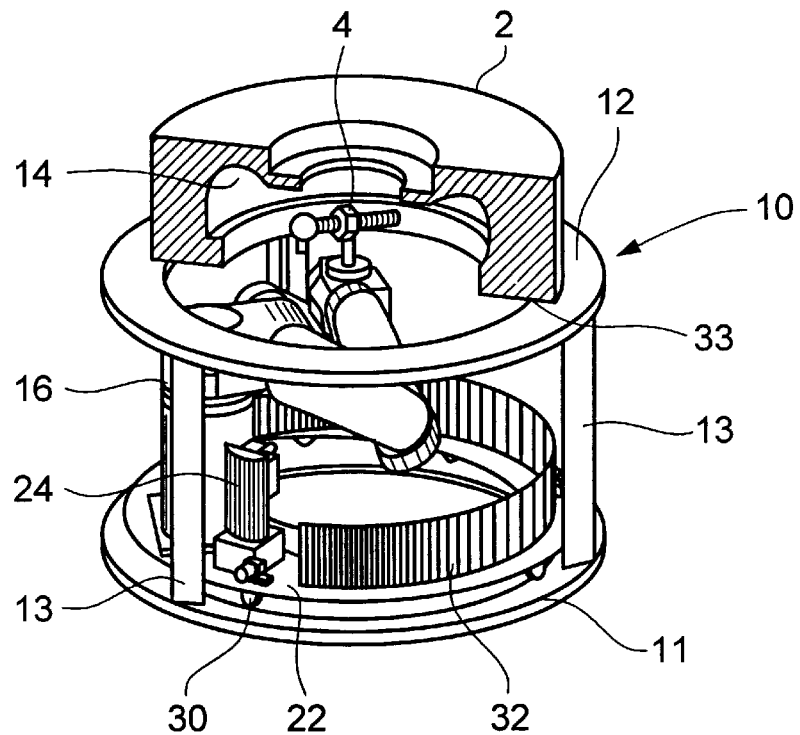

FIG. 4 illustrates the framework 10 according to FIG. 2 with the carrying ring 22 and the components arranged thereon according to FIG. 3. The handling unit 16 has a blasting device 4, which has a nozzle (not indicated specifically) through which a cleaning jet is directed against the inner wall 14 of the part-mold 2. Rotation of the carrying ring 22 can position the handling unit 16 in the circumferential direction.

Figure 5:
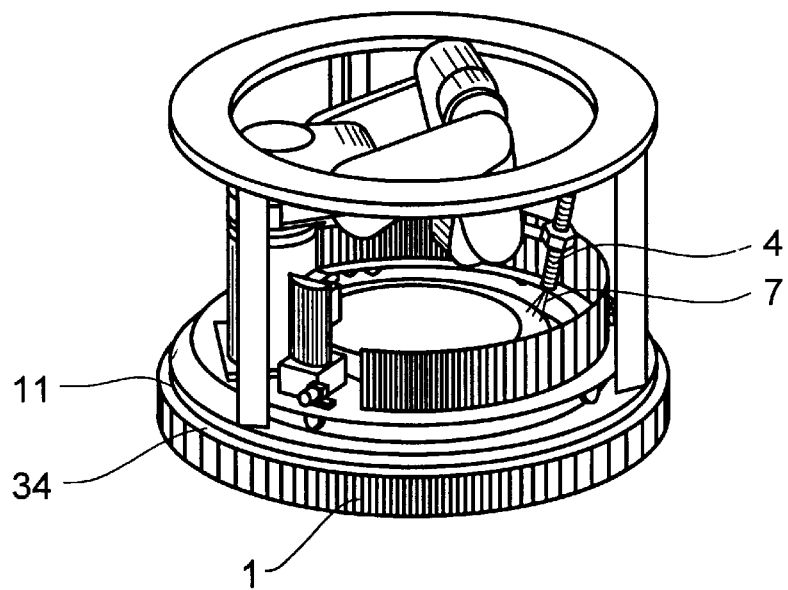

As can be seen from FIG. 4, the top part 12 butts against the end surface 33 of the mold part 2. The inner wall 14 of the mold part 2 can be cleaned in its entirety by virtue of the handling device 16 and the carrying ring 22 being moved. For the sake of clarity, the casing 3, which is arranged on the framework 10, has not been illustrated in FIG. 4. FIG. 5 illustrates a different position of the blasting device 4. The blasting device 4 is directed against the bottom mold part 1, as a result of which a jet 7 can clean the inner wall 14 of the mold part 1. As far as any further details of the apparatus are concerned, reference is made to the description of FIGS. 2, 3 and 4.

An apparatus for cleaning an inner wall 14 of at least one mold part 1, 2, is illustrated in FIGS. 2 to 5 operates as follows:

The framework 10 and the casing 3, which is not illustrated are positioned between the mold parts 1 and 2. At least one of the mold parts 1, 2 is (are) displaced such that the top part comes into contact with the end surface 33 of the mold part 2 and the bottom part 11 comes into contact with the end surface 34 of the mold part 1. As can be seen from FIGS. 4 and 5, the top part 12 butts against the end surface 33 of the mold part 2 and the bottom part 11 butts against the end surface 34 of the mold part 1. This produces an air-tight connection between the mold part 2 and the top part 12, and between the mold part 1 and the bottom part 11. A casing 3 (not illustrated) encloses the framework 10. The framework 10, with the casing 3, and the mold part 1 and the mold part 2 together define a chamber 9, in which the handling device 16 and the blasting device 4 are arranged. The cleaning operation may then be carried out, in which case a cleaning jet 7, which contains dry-ice pellets and compressed air, is directed against the wall 14 in a stepwise manner. Once cleaning has been completed, the connection between the mold part 1 and the mold part 2, and the framework 10 is released, and the framework 10 with the handling device 16 is removed from the other components in the space between the mold part 1 and the mold part 2.

Figure 6:
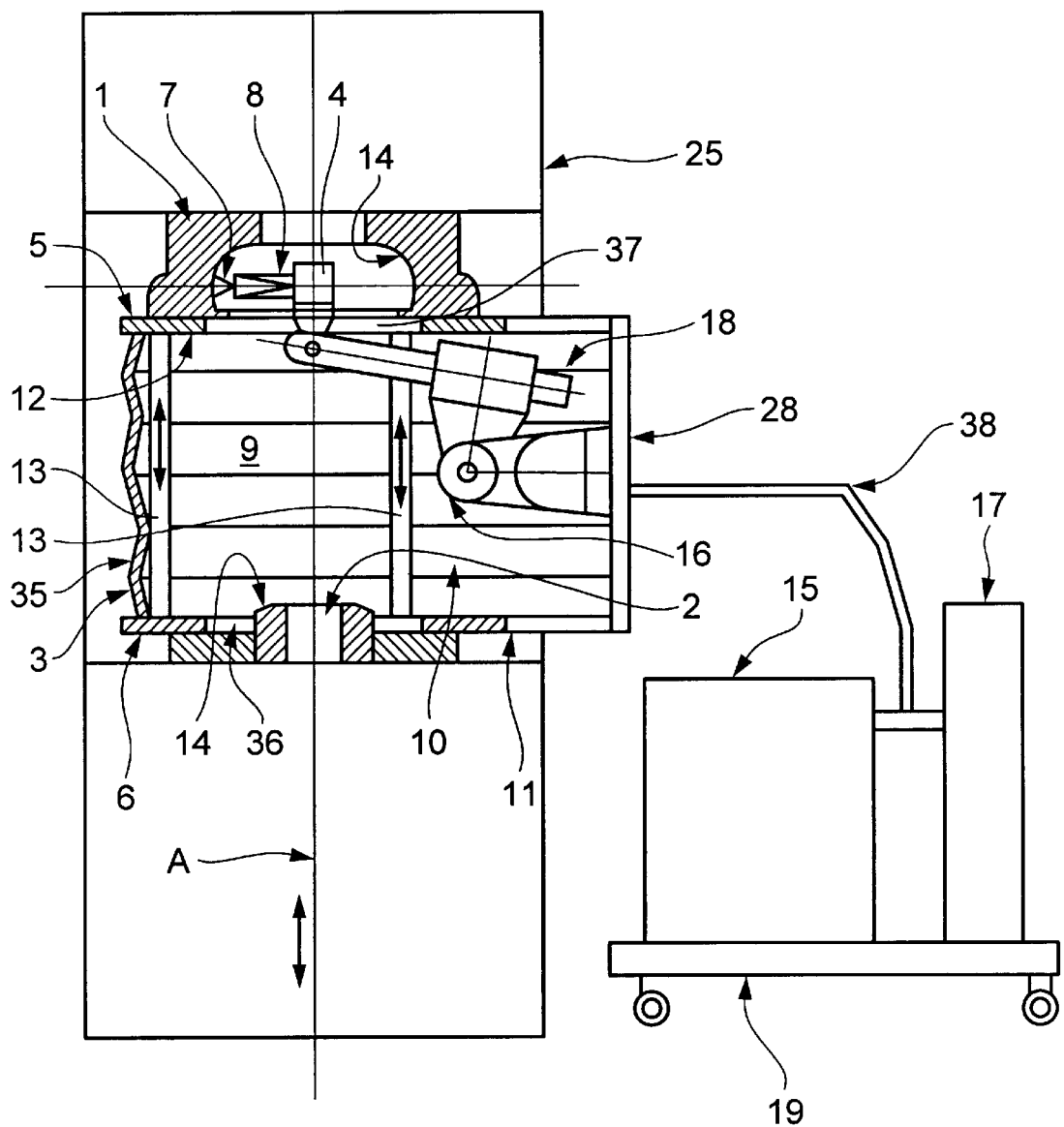

FIG. 6 shows another exemplary embodiment of an apparatus for cleaning an inner wall of a mold. The mold has a top mold part 1 and a lower mold part 2. The top mold part 1 and the bottom mold part 2 are designed to be displaceable relative to one another along the axis A. The top mold part 1 and the bottom mold part 2 form part of a machine 25. FIG. 6 shows an open mold, i.e.—the mold part 1 and the mold part 2 have been displaced relative to one another, in opposite directions, along the axis A.

An apparatus which has a casing 3 is provided for the purpose of cleaning an inner wall 14 of the top mold part 1 and/or of the bottom mold part 2. The casing 3 is of an essentially hollow-cylindrical design. It preferably is constructed of a flexible material. In order to reduce sound emission during a cleaning operation, the casing 3 has sound-insulating properties. Furthermore, the casing 3 is at least partially gas-permeable. The casing 3 is preferably designed wholly or partially as a particle filter 35, or is provided with a particle filter 35.

At its mutually opposite end regions, the casing 3 is connected to a bottom part 11 and a top part 12. The bottom part 11 and the top part 12 are of essentially plate-like design. The bottom part 11 has an opening 36 and the top part 12 has an opening 37. The opening 37 of the top part 12 is dimensioned such that it exposes the cross section of the opening of the top mold part 1. In the exemplary embodiment illustrated in FIG. 6, the bottom mold part 2 extends through the opening 36. The top part 12 and the bottom part 11 butt against the relevant mold parts. The casing 3 is connected to the bottom part 11 and the top part 12.

A blasting device 4, which has at least one blasting nozzle 8, is arranged in the chamber 9. Emerging through the blasting nozzle 8 against at least part of the surface of the inner wall 14 of the top mold part 1 and/or bottom mold part 2, is a cleaning jet which contains dry-ice pellets and a carrier medium. The blasting device 4 is connected to a supply unit 15 via supply lines 38. The supply unit 15 preferably comprises a supply container with dry-ice pellets and a compressed-gas source, which may be, for example, a gas cylinder.

The blasting device 4 is arranged on a handling device 16. The handling device 16 can be a multi-axis robot. The multi-axis robot is configured such that the cleaning jet 7 can clean the entire inner wall 14 of a mold. For this purpose, the multi-axis robot is preferably a six-axis robot. The handling device 16 has a central unit 17 which is connected to the handling device 16 via supply lines 38. The central unit 17 forms a control unit for the handling device 16. The handling device 16 is arranged in the chamber 9 in a stationary manner. It is connected to a connecting plate 38, which forms part of the wall of the chamber 9.

The supply unit 15 and the central unit 17, and preferably the casing 3, with the handling device 16, are arranged on a transportable load-bearing structure 19.

The functioning of that embodiment of an apparatus for cleaning an inner wall of at least one part-mold which is illustrated in FIG. 6 corresponds essentially to the functioning of that embodiment of an apparatus which is illustrated in FIG. 1.

Only preferred embodiments of the invention are specifically illustrated and described herein. It should be appreciated that the numerous modifications and variations of the present invention are possible in light of the present disclosure, such modifications and variations being encompassed within the scope of the appended claims without departing from the spirit and scope of the invention.

I claim:

1. A method of cleaning an inner wall of at least one mold part of a mold having at least two parts which can be displaced relative to one another along an axis and, in a closed state, form a complete mold, comprising the steps of:

creating a displacement along the axis between the two mold parts;

introducing a casing and a movable blasting device between the mold parts;

forming a chamber which is bounded by the casing and the mold parts;

producing a cleaning jet which comprises dry-ice pellets and a carrier medium from a blasting nozzle of the blasting device and;

moving at least the blasting nozzle such that the cleaning jet comes into contact with at least part of a surface of the inner wall.

2. The method according to claim 1, comprising telescoping the casing such that the casing butts against at least one of said mold parts at respective end regions of the casing.

3. The method according to claim 1, comprising displacing at least one of said mold parts along the axis such that the casing butts against at least one of said mold parts at respective end regions of the casing.

4. The method according to claim 1, comprising introducing a cage-like framework, on which the casing is secured, between the mold parts, the framework having an annular bottom part and an annular top part as well as spacers which are connected to the bottom part and the top part, and telescoping the spacers along the axis such that the bottom part and the top part butt against at least one of said mold parts.

5. The method according to claim 1, comprising forming an air-tight connection between respective end regions of the casing and the mold parts.

6. The method according to claim 1, comprising at least partially filtering out particles detached from the inner wall by constructing the casing to be at least partially gas permeable.

7. The method according to claim 1, comprising at least partially filtering out particles detached from the inner wall through a particle filter.

8. The method according to claim 1, comprising directing the cleaning jet against the inner wall in a continuous stepwise manner.

9. The method according to claim 1, comprising directing the cleaning jet against a first individual section of the inner wall such that said cleaning jet passes over said first individual section one or more times before being directed against a second individual section of said inner wall.

* * * * *

UNITED STATES PATENT AND TRADEMARK OFFICE
CERTIFICATE OF CORRECTION

PATENT NO. : 5,932,026
DATED : 8/3/99
INVENTOR(S) : Trampusch

It is certified that error appears in the above-identified patent and that said Letters Patent is hereby corrected as shown below:

Column 10, line 59, Please reinstate dependent claims 10-12

10. The method according to Claim 1, comprising positively controlling the movement of the cleaning jet.

11. The method according to Claim 1, comprising abutting the mold parts with the casing in a sound-tight manner.

12. The method according to Claim 4, comprising displacing the blasting device along an essentially circular path.

Signed and Sealed this

Seventh Day of March, 2000

Attest:

Attesting Officer

Q. TODD DICKINSON

Commissioner of Patents and Trademarks